United States Patent [19]

Cornthwaite

[11] 3,923,694

[45] Dec. 2, 1975

[54] METHANOL SYNTHESIS CATALYST

[75] Inventor: Derek Cornthwaite, Chicago, Ill.

[73] Assignee: Imperial Chemical Industries Limited, London, England

[22] Filed: July 26, 1974

[21] Appl. No.: 492,206

Related U.S. Application Data

[63] Continuation of Ser. No. 227,607, Feb. 18, 1972, abandoned, which is a continuation of Ser. No. 16,600, March 4, 1970, abandoned.

[52] U.S. Cl. ............................... 252/463; 260/449.5
[51] Int. Cl.² ......................................... B01J 21/04
[58] Field of Search .......... 252/463, 476; 260/449.5

[56] References Cited
UNITED STATES PATENTS

| | | | |
|---|---|---|---|
| 2,444,509 | 7/1948 | Patieff et al. | 252/463 X |
| 2,677,649 | 5/1954 | Kirshenbaum et al. | 252/463 X |
| 3,388,972 | 6/1968 | Reitmeier et al. | 252/463 X |

*Primary Examiner*—W. J. Shine
*Attorney, Agent, or Firm*—Cushman, Darby & Cushman

[57] ABSTRACT

A methanol synthesis catalyst precursor comprises copper oxide and a support comprising spinel-forming metal oxides, spinel being present in crystallites not larger than 120 Angstrom units. Using catalyst prepared from such a precursor by reduction, methanol synthesis can be operated without catalyst changing for longer periods than when using a similar catalyst containing no spinel. A precipitation method for making the precursor is described.

9 Claims, No Drawings

METHANOL SYNTHESIS CATALYST

This is a continuation of application Ser. No. 227,607, filed Feb. 18, 1972, now abandoned, which in turn is a continuation of application Ser. No. 16,600, filed Mar. 4, 1970, now abandoned.

This invention relates to a copper-containing catalyst precursor and catalyst, to a method of making them, and to methanol synthesis by reacting one or more oxides of carbon with hydrogen over a copper-containing catalyst.

Synthesis of methanol over a copper-containing catalyst has been known to be possible since the 1920's but it is only since the 1950's that it has been industrially practised. This is apparently been because the catalyst is sensitive to a great variety of factors which influence its activity. Still more recently a process has been developed which operates for long periods without significant loss of catalyst activity and affords an acceptable output of methanol at pressures as low as 50 atmospheres. We have now discovered improved catalysts and a method of making them, as a result of which the output of methanol can be usefully increased. For convenience the new catalysts will be defined in terms of their oxide-form, that is, their precursor compositions.

According to the invention a methanol systhesis catalyst precursor comprises copper oxide and a support comprising the oxides of at least one divalent and at least one trivalent metal capable of forming a mixed oxide having the spinel structure characterised by the presence of spinel in crystallites not larger than 120 Angstrom units.

In the catalyst precursor according to the invention the spinel crystallites are preferably not greater than 80 Angstrom units, for example 30–40 Angstrom units, in size in any dimension. The copper oxide crystallites are preferably not greater than 120 Angstrom units, especially 70 Angstrom units, in size in any dimension. The spinel and copper oxide crystallites are suitably in the form of short prisms, cubes, spheroids and spheres, that is, non-elongate shapes.

By crystallite size is meant the average length of cyrstallite as determined by X-ray diffraction using the method described in Chapter 9 of "X-ray diffraction procedures" by H. P. Klug and L. E. Alexander, published by Chapman and Hall Limited, London 1954. The "diffraction line broadening" principle described therein is based on the method of Scherrer as described in Nachrichten der Gesellschaft der Wissenschaft, Guettingen 1918, vol. 98. The crystal lattice directions which are most conveniently measured are (110) for the spinel and one or more of (002, 111), (200, 111) and (202) for the copper oxide, as denoted by the usual Miller Index system. In applying this method the catalyst precursor is in the form of a compressed pellet such as would be charged to a methanol synthesis converter or in the form of powder.

It is believed that only a small extent, e.g. 2%, of spinel-formation is necessary in order to endow the catalyst with improved stability and activity. Thus the catalyst precursor can be made without the strong heat-treatment usually required in the formation of spinels. Greater extents of spinel formation, for example, 10–20% or more can be used if desired.

We have also discovered a method of making the catalyst precursor, which comprises co-precipitating from aqueous solution thermally decomposable compounds of at least two metals whose oxides are capable of forming together a mixed oxide having the spinel structure, then preciptiating one or more copper compounds from aqueous solution in the presence of the first-formed precipitate, washing the whole precipitate and calcining it to give the metal oxides. The precursor is subjected to a reduction treatment to give active catalyst, which constitutes a further feature of the invention.

Since the catalyst is to be for methanol synthesis it will be appreciated that metals which interfere with methanol synthesis, such as iron, cobalt and nickel, should not be used. The support and first-formed precipitate may themselves include copper compounds but it is preferred that they do not, or at least that not more than a small proportion, for example about 10% of copper (by metal atoms), is incorporated into the catalyst in this way.

The divalent metal is preferably zinc, but other metals such as manganese or magnesium can be used. Th trivalent metal is preferably aluminum or chromium, especially aluminium.

The relative proportions of the two spinel-component metals in the support or in the first precipitation are preferably within about 10% of the ratio required to form the spinel. It is to be understood that since two or more divalent metals can be used, the above-mentioned ratio takes into account the possibility of mixed spinels.

The support oxides preferably constitute from 10–60% especially 15–30% by weight of the total catalyst precursor.

It is preferred that zinc oxide should be intimately associated with the copper oxide in the precursor, that is, that the support carries zinc oxide as well as copper oxide. Hence in the second precipitation it is preferred to have zinc compounds participating; and other metal compounds, such as of magnesium, aluminium, chromium or manganese, may also be present. It is found preferable to use copper and zinc only. In any event it appears to be advantageous to have at least one divalent metal compound common to both the first and at the second precipitation. Very suitably this common metal is zinc. The content of copper oxide is preferably from 3 to 5 times by weight of the quantity of zinc oxide carried by the support.

If one or more compounds of metals other than copper are precipitated in the presence of the first-formed precipitate, it or these can be precipitated before or after the copper compound, but it is preferred to co-precipitate at least part of it or these with the copper compound.

The copper content of the precursor catalyst can lie anywhere within a wide range, e.g. 10–80%. However for an optimal combination of initial catalytic activity and the stability of that activity during use of the catalyst, a copper content of 25–70% is preferred, especially about 60%. When the copper content is in this preferred range, the total zinc content is preferably less, especially 0.3 to 0.6 of the copper. All these percentages and ratios are by metal atoms.

In preferred precursors or catalysts containing copper and zinc the total content of oxides other than copper and zinc is suitably in the range 2–40% especially 4–20% and is suitably less than that of the zinc, again calculated by atoms of the total metals present.

The precursor or catalyst may additionally contain support materials added as powdered solids such as alumina for the purpose of dilution, controlling pellet density and providing other mechanical requirements, for example inhibition of shrinkage while in use. These may be added at any convenient stage of catalyst preparation, for example to any one of the solutions used in co-precipitation, to the washed or unwashed precipitate or to the metal oxides after calcination.

It will be appreciated that the catalyst is usually stored, handled and sold in the form of its precursor, which indeed is referred to in commerce as the "catalyst", although it is not the catalyst in the strict sense of the agent taking part in chemical reactions such as methanol synthesis. Reduction of the precursor to the catalyst is normally carried out by the operator of the chemical process. The precursor may be in shapes, e.g. pellets, as required by the user of the catalyst, or may be in its condition before the shaping operation, e.g. as powder or lightly compressed powder.

In the method for making the catalyst the reaction conditions for each precipitation should be carefully controlled. For the second precipitation, and preferably also for the first, the temperature is preferably in the range 50–100, especially 70°–100°C, and the pH of the slurry after the reaction has just been completed should be preferably between 1 unit on the acid side of neutrality and 2 units on the alkaline side; but a better catalyst results if the pH is within 0.5 unit of neutrality. (The pH for the reaction is defined in this way rather than by a pH number because the pH of neutrality varies with temperature, being about 7.0 at 25°C and 6.6 at 50°C for example, according to Harned and Hamer J.A.C.S., 1933, 55, 2179–2206, and thus well below 7.0 in the especially preferred precipitation temperature range 70–100°C.) It is preferred that the precipitant salt should be a carbonate or bicarbonate of an alkali metal. The first precipitate may be washed before carrying out the second precipitation; whether or not this is done, after the second precipitation the precipitate is thoroughly washed. Washing is important in order to keep down the content of alkali metal in the catalyst: the alkali content should preferably be less than 0.2%, especially less than 0.1%, by weight of the non-volatiles in the final catalyst.

After washing, the precipitate is usually dried under mild conditions, for example overnight at 110°C, then calcined at for example 300°C to convert the precipitated metal compounds to oxides. The product is an oxide form of the catalyst i.e. the catalyst precursor and is ready for shaping into e.g. pellets. It may be ground before shaping; and pelleting is suitably by dry-compression in presence of graphite as lubricant.

The first precipitate can be subjected to other treatments such as drying, calcination, before introducing it to the second precipitation, but it is simplest and satisfactory to introduce it while still wet from its own formation. Conveniently it can be slurried with any of the solutions taking part in the second precipitation.

The invention provides also a methanol synthesis process which is, as a result of the special catalyst employed, capable of industrial operation for long periods without loss of output, in contrast to some earlier processes using less satisfactory catalysts. This applies even at the comparatively low pressures and temperatures at which it is preferred to operate the process. It is capable of producing methanol of high purity: the crude product has only a small content of organic impurities. Furthermore it is an economically attractive process, even for medium scale operation. Examples of processes which can be improved by the catalyst according to the invention are described in our U.K. specifications 1,010,871 and 1,159,035.

It is preferred to use a mixture of carbon monoxide and carbon dioxide in the gas in contact with the catalyst. The percentage by volume of carbon dioxide in this feed gas is preferably between 1 and 20, especially between 3 and 12%. The percentage of the carbon dioxide can be equal to, or greater or less than, that of the carbon monoxide. It is preferred to use as the source of synthesis gas for the process a hydrocarbon-steam primary reforming process operated at a temperature and pressure which will give the required gas mixture; the synthesis gas so produced is substantially freed of the excess steam which it initially contains but is fed to the methanol synthesis plant system preferably without removal of carbon dioxide. Alternatively the synthesis gas is made by partial oxidation of methane. As a further alternative the excess hydrogen produced by reforming natural gas and left over can be used after methanol synthesis for other purposes such as ammonia synthesis, hydroisomerisation and other petrochemical operations, or even burnt as a fuel, for example in the reforming furnace.

The synthesis gas should be substantially sulphur-free, that is, should preferably not contain more than about 1 ppm by weight of sulphur. If gas containing less than 0.1 ppm of sulphur can be obtained, this is still more advantageous. Such low sulphur contents are very conveniently reached, when using liquid feedstocks, by the process of our U.K. Specification No. 902,148. The susceptibility of copper-containing catalysts to poisoning, and the usefulness of "guard catalysts" in conjunction with them, are well known.

The ratio by moles of carbon oxides to hydrogen in the gas in contact with the catalyst is preferably between the stoichiometric ratio and 1:10. It appears that a faster reaction results from having more than the stoichiometric proportion of hydrogen in the gas which contacts the catalyst. Preferably in order to make use of this higher rate of reaction the ratio is between 1.3 and 3 times the stoichiometric ratio. On the other hand the process operates satisfactorily and produces good quality methanol at ratios at or not much below the stoichiometric.

The total combination process involving synthesis gas generation and methanol synthesis constitutes a unitary industrial process and in itself is a further feature of the invention. Preferably the steam raised by the waste heat boilers in which crude synthesis gas is cooled feeds turbines driving the synthesis gas compressor and circulator.

The pressure at which the process is operated is preferably in the range up to 200 atmospheres and especially 10 to 150 atmospheres, for example 80 to 120 atmospheres. These are absolute pressures. Such pressures are conveniently equal to the pressure at the exit of the synthesis gas production plant or at most 5 times as great. Conveniently the pressure is raised to that required for the synthesis by means of a rotary compressor, and indeed, one of the advantages of the invention is that it makes possible the use of rotary compressors in a medium-output plant, for example producing 120 tons of methanol per day and upwards.

The temperature at which the process is operated is preferably in the range 160°–300°C especially 190°–270C.

The volume space velocity at which the process is operated is preferably more than 2000 hr.$^{-1}$ and is suitably much higher, for example up to 50,000 hr.$^{-1}$, especially 5,000 to 25,000 hr.$^{-1}$. These space velocities are on the basis of a pressure of 1 atmosphere absolute and a temperature of 20°C.

The process can be operated as a multistage once-through process: if it is, then it is preferred to remove methanol as well as to adjust the temperature between the stages. Preferably however a recycle system, in which unconverted reactancts are recycled to the methanol synthesis after removal of methanol from the gas leaving the catalyst, is used. Such a system can include more than one stage of methanol synthesis and removal in the recycle loop. If it is desired, in a recycle system, to keep up the ratio of hydrogen to carbon oxides to the above-stoichiometric levels mentioned above, it follows that the gas recycled can contain a higher hydrogen to carbon oxides ratio than the synthesis gas supplied to the system. In any process according to the invention, temperature control in or between synthesis converters can be any suitable method, for example feed gas preheaters, coolers or quenches; and the preferred operating conditions make it possible to use very economical reactor designs.

EXAMPLE

To a solution of sodium aluminate (387 g) in water (2000 mls.) there were added 1100 ml. of 70% (w/w) nitric acid. Aluminium hydroxide was precipitated at first but re-dissolved on stirring. To the resulting solution was added a solution of zinc nitrate hexahydrate (597 g.) in 500 mls. of water, followed by sufficient water to bring the volume to 6,000 mls. The solution was heated to 85°C and passed through a mixing zone at the same time as a molar solution of sodium carbonate at 85°C, the rates of flow being such as to give a slurry pH of 6.5 measured at 65°C. The resulting precipitate was filtered and washed: it contained 3.5% w/w of ZnO and 4.6% of $Al_2O_3$. A quantity of it (1394g.) was re-slurried with water (3000 mls.) and mixed with a solution (1200 ml.) containing cupric nitrate trihydrate (435g.) and zinc nitrate (134g.). The total slurry was heated to 85°C and passed through a mixing zone at the same time as a molar solution of sodium carbonate at 85°C, the rates of flow again being such as to give a slurry pH of 6.5 at 65°C. The whole slurry was then aged by warming to 85°C over 10 minutes, then holding at 85°C for 20 minutes, both with gentle stirring. It was filtered, washed throughly to decrease the sodium content to less than 0.1% as $Na_2O$, then dried overnight at 110°C. The dried cake was calcined at 300°C for 6 hours, then crushed, mixed with 2% of graphite and pelleted in squat cylinders 3.6 × 5.4 mm. of bulk density 2.2 g./cc.

The pellets had the following percentage composition by weight

| | |
|---|---|
| CuO | 60.1 |
| ZnO | 22.2 |
| $Al_2O_3$ | 7.9 |
| $Na_2O$ | 0.03 |
| loss at 900°C | 9.4 | which corresponds to an atomic ratio of approximately $Cu_6 Zn_{2.33} Al_{1.67}$. Their mean copper oxide crystal size was (in Angstrom units):

| | |
|---|---|
| 002, 111 faces: | 43 |
| 200, 111 faces: | 49 |
| 202 face: | 52 |

The spinel crystal size was substantially in the range 30–40 Angstrom units, measured after dissolution of the copper oxide and zinc oxide by dilute acid.

A sample of these pellets was crushed to pass B.S.S. sieve 18 but not 25, then tested in a methanol synthesis process operated under the following conditions:

| | |
|---|---|
| Temperature | 250°C |
| Pressure | 50 atmospheres |
| Space velocity | 40,000 hour$^{-1}$ |
| Starting gas composition | CO 10% by volume |
| | $CO_2$ 10% |
| | $H_2$ 80% |

Before beginning synthesis the pellets were reduced at atmospheric pressure by means of this gas at a space velocity of 25,000 hour$^{-1}$, raising the temperature slowly to 250°C. Initially the catalyst activity, measured as the volume percentage of methanol appearing in the outlet gas per gram of catalyst was 3.64. This is substantially above the activity (2.55) of a catalyst having the composition $Cu_6Zn_3Al_1$ which had been made by a single co-precipitation of all the three metal compounds and contained substantially no acid-insoluble spinel.

For this test the outflowing gas was analysed for methanol by vapour phase chromatography: this gas was not recycled to the catalyst but its composition was, apart from the methanol which would be recovered from it, such that in large scale operation it would be recycled; that is, the percentage conversion to methanol was at the low level typical of a recycle-type process in which the life of the catalyst is especially long. The test using crushed catalyst at the space velocity of 40,000 hour$^{-1}$ simulates a large scale recycle process at a space velocity of about 10,000 hour$^{-1}$ over whole catalyst pellets.

A repeat preparation of these pellets on a larger scale was reduced and tested in a semi-technical reactor employing recycle, the process conditions being

| | | |
|---|---|---|
| Temperature | | varied so as to maintain constant methanol output. |
| Pressure | | 100 atmospheres |
| Space velocity (this is the total gas passing over the catalyst) | | 9600 hour$^{-1}$ |
| Starting gas composition (at entry to catalyst bed) | | |
| | CO | 7% by volume |
| | $CO_2$ | 12% |
| | $H_2$ | 55% |
| | $CH_4$ | 26% |

| | | Period of use, days | | | | | |
|---|---|---|---|---|---|---|---|
| | | 0 | 4 | 8 | 16 | 32 | 64 | 128 |
| Mean catalyst temperature to product 0.5 kg/hour of methanol per litre of catalyst | This catalyst | 207 | 209 | 212 | 215 | 218 | 222 | 226 |
| | Control | 221 | 226 | 233 | 237 | 243 | 252 | 264 |

The control is a catalyst similar to the $Cu_6Zn_3Al_1$ catalyst mentioned in the previous paragraph but made on a larger scale.

It is evident that the new catalyst is considerably superior to the known catalyst when operated at 100 atmospheres pressure, although the control is known to be satisfactory when operated at 50 atmospheres pressure and at a correspondingly lower rate of methanol production. It is evident too that the new catalyst will require an operating temperature of 240°C after about 2 years' operation and will thereafter still be operable for a considerable period.

I claim:

1. A methanol synthesis catalyst precursor comprising copper oxide in an amount such that said precursor comprises 10–80% copper with the balance essentially a spinel structure support comprising the oxides of zinc and aluminum, said precursor being characterized by the presence of spinel in crystallites not larger than 120 Angstrom units.

2. A catalyst precursor according to claim 1 in which the spinel is present as crystallites not greater than 80 Angstrom units in size.

3. A catalyst precursor according to claim 1 in which the copper oxide crystallites are not greater than 120 Angstrom units in size.

4. A catalyst precursor according to claim 3 in which the copper oxide crystallites are not greater than 70 Angstrom units in size.

5. A catalyst precursor according to claim 1 in which the support carries also zinc oxide.

6. A catalyst precursor according to claim 5 in which the copper oxide content is from 3 to 5 times the quantity of zinc oxide carried by the support.

7. A method of making a catalyst precursor according to claim 1, which comprises co-precipitating from aqueous solution compounds thermally decomposable to the oxides of zinc and aluminum, then precipitating one or more copper compounds thermally decomposable to the oxides from aqueous solution in the presence of the first-formed precipitate, washing the whole precipitate, and drying and calcining it to give the corresponding metal oxides.

8. A method according to claim 7 in which the first said co-precipitation includes not more than 10% of copper by metal atoms.

9. A methanol synthesis catalyst precursor consisting essentially of copper oxide and zinc oxide on a support, the copper oxide being present in an amount such that said precursor is 10–80% copper and the support consisting essentially of the oxides of zinc and aluminum forming together a mixed oxide having the spinel structure, said precursor being characterized by the presence of spinel in crystallites not larger than 120 Angstrom units and copper oxide crystallites not greater than 120 Angstrom units in size, the copper oxide content being from 3 to 5 times the quantity of zinc oxide carried by the support.

* * * * *

UNITED STATES PATENT OFFICE
CERTIFICATE OF CORRECTION

PATENT NO. : 3,923,694
DATED : December 2, 1975
INVENTOR(S) : DEREK CORNTHWAITE

It is certified that error appears in the above-identified patent and that said Letters Patent are hereby corrected as shown below:

Please add the following to the front page format after the application number:

[30] Foreign Application Priority Data

March 4, 1969    Great Britain    11494/69

On the title page, last line of first column, "Patieff" should read --Ipatieff--.

Column 1, line 42, "cyr-" should read --cry- --;

line 49, "Gu-" should read --Go- --;

line 50, "ettingen" should read --ttingen--.

Signed and Sealed this ninth Day of March 1976

[SEAL]

Attest:

RUTH C. MASON
Attesting Officer

C. MARSHALL DANN
Commissioner of Patents and Trademarks